Nov. 19, 1957     E. J. GRACON     2,813,439
ADJUSTABLE DRILL JIG
Filed Jan. 18, 1956     2 Sheets-Sheet 1
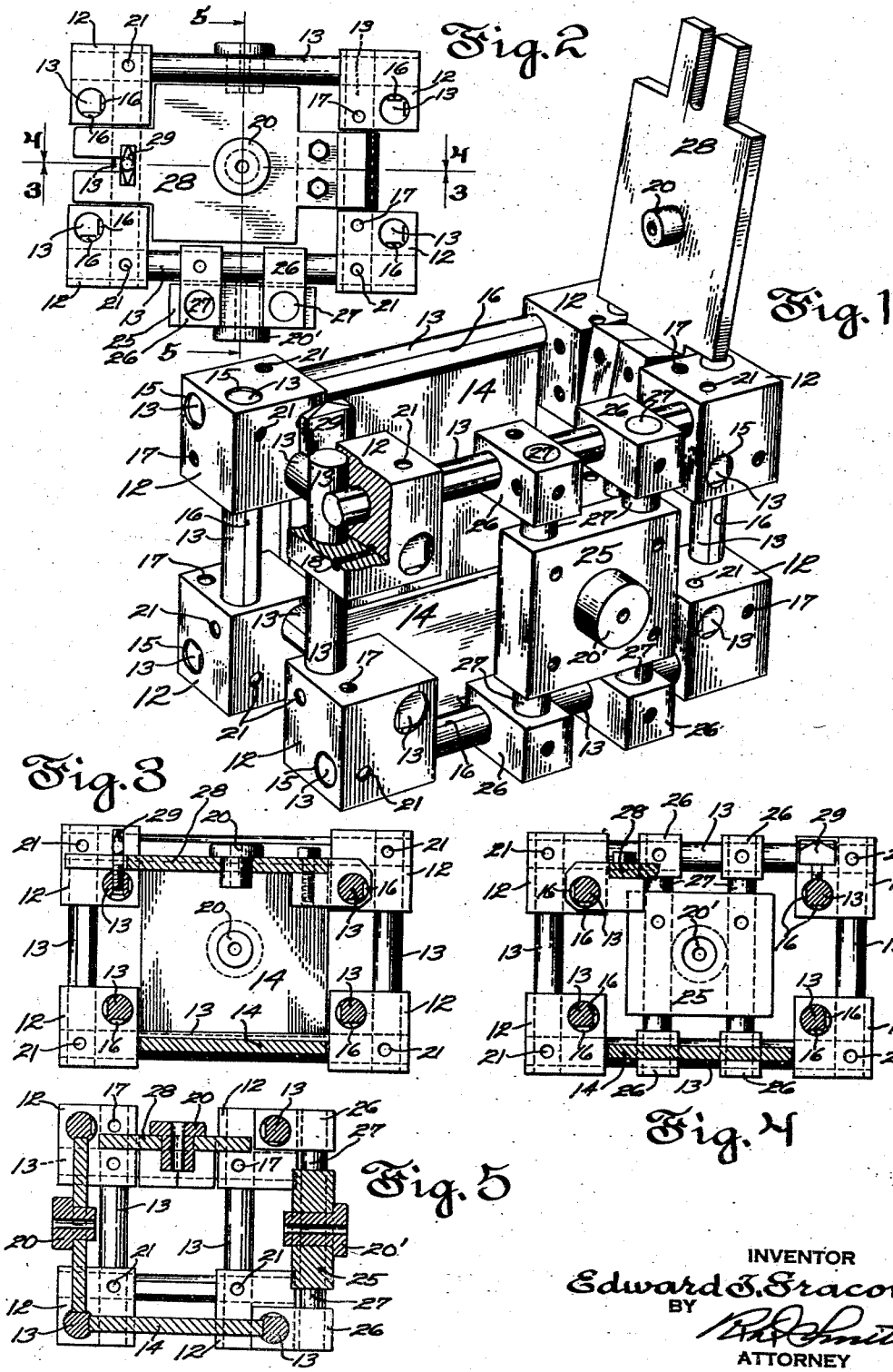
INVENTOR
Edward J. Gracon
BY
ATTORNEY Nov. 19, 1957  E. J. GRACON  2,813,439
ADJUSTABLE DRILL JIG
Filed Jan. 18, 1956  2 Sheets-Sheet 2

INVENTOR
Edward J. Gracon
BY
*Ralph Smith*
ATTORNEY

United States Patent Office 2,813,439
Patented Nov. 19, 1957

2,813,439
ADJUSTABLE DRILL JIG
Edward J. Gracon, Ansonia, Conn.
Application January 18, 1956, Serial No. 559,961
5 Claims. (Cl. 77—62)

This invention relates to drill jigs and particularly to drill jigs of the work boxing type adapted at least partially to house a workpiece placed therein to be drilled. Ordinarily drill jigs of the type which house and hold a workpiece, as distinguished from jigs which merely attach to the workpiece, have incorporated a base casting of considerable mass having side walls rising from and integral with it and supporting drill bushings.

It is an object of this invention so to construct a drill jig that its size and proportions may be varied at will so as to bring the drill bushings into close proximity to various points on the workpiece where holes are to be drilled. This provides maximum firmness of guiding support for the drills and makes it possible to adjust a jig having this advantageous feature so as to accord with workpieces of various shapes and proportions.

A further object is to construct a drill jig so that it shall be desirably rigid while composed of a plurality of component parts or groups of parts at least some of which in their essential aspects are duplicates and capable of being assembled interchangeable with one another. In this way a minimum variety and quantity of the component parts need be kept on hand from which to choose in constructing a drill jig to suit any particular workpiece.

A further object is to provide a drill jig constructed of parts which can be made from stocks of bar, rod or plate steel instead of from iron castings. This makes possible a jig of any given size that is lighter in weight without sacrificing strength and rigidity in the assembled structure. Another object is to enable the jig to rest on any one of its several sides with equally firm stability so that holes can be drilled in a contained workpiece in various directions in an ordinary vertical drill press.

The foregoing and other objects of the invention are more fully referred to in the following description of a successfully operative drill jig embodying the present improvements, the description having reference to the accompanying drawings wherein:

Fig. 1 is a perspective view of a drill jig embodying the invention with cover lifted to permit ready insertion and removal of the work, one of the corner blocks being broken away to expose the relationship of frame rods.

Fig. 2 is a plan view of the drill jig with cover closed down drawn on a somewhat smaller scale.

Fig. 3 is a view looking in the direction of arrows 3—3 from the section line in Fig. 2.

Fig. 4 is a view looking in the direction of arrows 4—4 from the same section line in Fig. 2.

Fig. 5 is a view taken in section on the plane 5—5 in Fig. 2 looking in the direction of the arrows.

Figure 6:
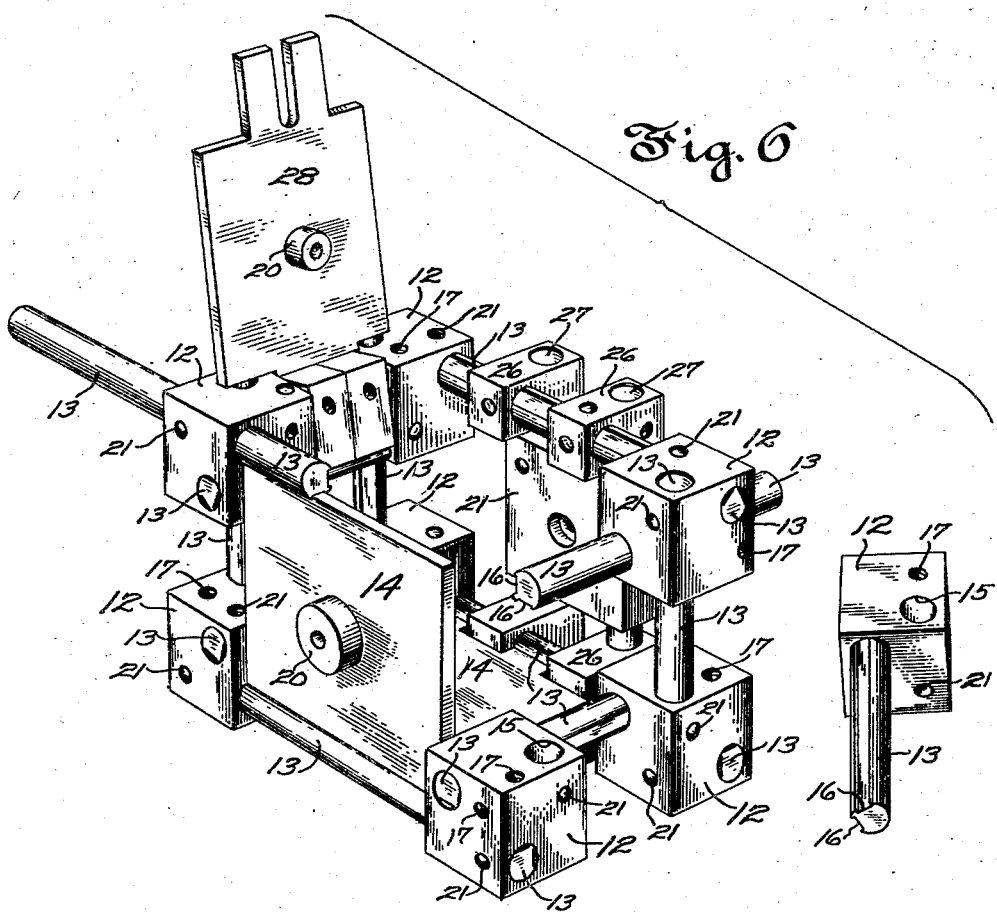
Fig. 6 is a perspective view of the jig partially disassembled.
Figure 7:
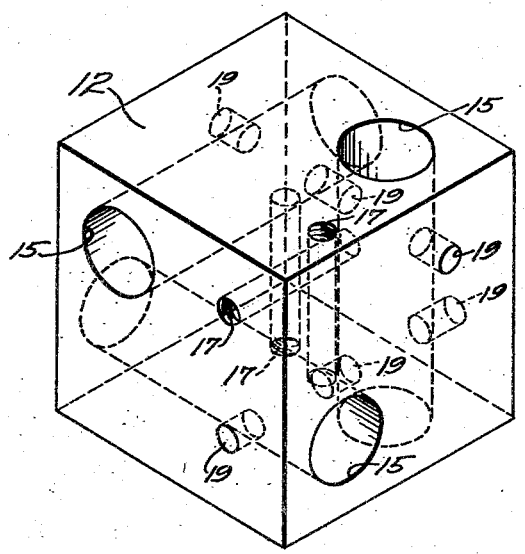
Fig. 7 is an isometric view of one of the corner blocks showing the arrangement of holes therein.

According to the present invention a drill jig may comprise an assemblage of component parts or sets of such parts that are individually of small size instead of massive and that are preferably of such shapes individually that they may constitute machined bars, rods or plates of steel. Certain of the groups of parts may be of like kind or identical and all are so secured together that a rigid framework results. Such framework constitutes a work boxing type of drill jig whose proportions as to overall length, breadth and depth can be varied at will through selection and adjustment of component parts that will best accord with whatever size and shape workpiece is to be held and drilled in the jig.

In the embodiment of the invention herein chosen to illustrate the underlying principle of the improvements use is made mainly of three different kinds of component parts, represented respectively by the corner blocks 12, the frame rods 13 which connect them, and the wall panels 14 which are lodged at their marginal edges in keyway grooves 16 in the frame rods.

The manner in which these component parts can be fitted together in selective and adjustable relationship is evident from the drawings. Each corner block 12 contains three through-holes 15 which extend in perpendicular and offset passing relation to one another. Three of the frame rods 13 are a snug slidable fit in holes 15 respectively in each block and consequently project from the block in three perpendicularly related directions which makes it possible to determine and maintain a choice of dimensions as to length, breadth and depth of the assembled drill jig.

Boundary wall panels 14 may be selective sizes each having two opposite marginal edges lodged respectively in the snug fitting longitudinal grooves 16 of frame rods 13 between corner blocks 12 while these rods are firmly lodged in their inserted relationship to the blocks 12.

Each frame rod 13 has at least two of the grooves 16 displaced about the rod at any angle of 90° whereby each rod can form a right angled joint between adjacent marginal edges of two perpendicularly related wall panels 14. At another point in the length of each rod grooves 16 also serve as keyways to receive the inner or binding end of set screws 17 that threads into each block. The wrench or screw driver receiving ends of screws 17 are accessible through the outer surface of the block. For further assurance of a firm and accurate location for the frame rods relative to the blocks there is provided in addition to the threaded holes 18 for set screws 17 two dowel holes 19 in each block. Each dowel hole 19 is aligned diametrically with two of the frame rods 13 so that if a drill is passed through these dowel holes when the connecting rods are in their chosen position in the block the dowel holes will be extended to pass diametrically through the frame rods. Or there may be dowel holes 19 already predrilled in the frame rods and which may align with mating dowel holes 19 already predrilled in the block. A dowel pin 21 when driven into dowel holes 19 will pass through two of the frame rods 13 and thus will aid the set screws 17 in maintaining positive fixity between the frame rods and the blocks.

Having chosen and assembled a quantity of frame rods 13 of selected lengths suitable to form a drill jig of the size desired to house a given workpiece, the selected blocks and frame rods may be assembled as shown in Fig. 1 with such wall panels 14 in place as are needed to support drill bushings 20 in proper relation to such portions of the workpiece as are to be drilled.

The drawings show an additional way of supporting a drill bushing if its location is desired to be in outboard relation to the plane box-like boundaries of the jig. Such outboard support for the drill bushing 20' may be provided by a slab 25 having holes drilled edgewise therethrough to receive with a snug fit two auxiliary vertical rods 27 that are of suitable length to project upward and downward beyond slab 25 and to pass through and be supported by auxiliary blocks 26. A pair of the blocks 26 is mounted on each of two of the main frame rods 13 intermediate the corner blocks 12. The means for fastening the auxiliary blocks 26 on connecting rods 13 and for fastening the auxiliary rods 27 in the blocks 26 and in the slab 25 may be like that already described for fastening frame rods 13 in the corner blocks 12 and can include the use of set screws and/or dowels similar to 17 and 21 aforesaid.

The drawings also show a way of incorporating in the jig a hinged cover 28 carrying a drill bushing 20' so that the cover pivots on one of the frame rods 13 between its closed position shown in Figs. 2 and 4 and its open position shown in Figs. 1 and 6. In its closed position the cover 28 can be fastened down by a turn button screw 29 having threaded engagement crosswise with one of the frame rods 13.

For any two of the corner blocks 12 there may be substituted a bar equal to the combined length of said two blocks and the portion of a frame rod that extends therebetween. In such case the jig would require only four of such bar shaped corner blocks. Such bar may have its frame rod receiving end portions of cross-sectional size like that of the blocks 12 and it will contain holes receptive to the frame rods 13, set screws 17 and dowel pins 21 bearing the same relative arrangement as in the corner blocks 12.

This and various other ways of utilizing the inventive principles of construction disclosed herein will be suggested by the present disclosure wherefore the appended claims are directed to and intended to cover all substitutes and equivalents for the particular shapes and arrangements of parts herein disclosed that come fairly within the broadest interpretation of the wording of the claims:

I claim:

1. A work boxing drill jig of adjustable size and proportion comprising, a hexahedral knockdown and adjustable framework including at least four corner forming blocks containing transverse holes, frame rods extending from block to block and occupying said holes, at least one panel forming a boundary wall of the jig extending edgewise from rod to rod intermediate said blocks, means to hold said panel removably in fixed relation to said rods, and at least one drill bushing carried by said panel.

2. A drill jig as defined in claim 1, in which there are two of the said boundary wall forming panels disposed in perpendicular relation, and there are two of the said grooves in a common frame rod angularly displaced ninety degrees, said grooves being occupied respectively by marginal edges of said perpendicularly related panels.

3. A drill jig as defined in claim 1, in which the said means to hold the said panel comprise grooves in the said frame rods occupied respectively by marginal edges of the panel.

4. A drill jig as defined in claim 3, in which the said panel holding grooves are continuous lengthwise of the said frame rods and extend into the said holes in the said corner forming blocks, together with set screws in said blocks engaged with said grooves.

5. A drill jig as defined in claim 3, in which the said frame rods contain dowel holes and one of the said corner blocks contains at least two dowel holes, each of said dowel holes intersecting a different pair of said rod occupied holes, together with dowels in said dowel holes lodged in said blocks and in said rods for maintaining the said panel holding grooves facing in predetermined directions.

References Cited in the file of this patent

FOREIGN PATENTS

| 3,221 | Great Britain | 1910 |
| 348,730 | Great Britain | May 21, 1931 |

OTHER REFERENCES

American Machinist, Drill Jig Design, pages 816 to 819, May 12, 1921.